United States Patent
Chong et al.

(10) Patent No.: US 11,841,967 B2
(45) Date of Patent: *Dec. 12, 2023

(54) SYSTEMS AND METHODS OF DATABASE ENCRYPTION IN A MULTITENANT DATABASE MANAGEMENT SYSTEM

(71) Applicant: salesforce.com, inc., San Francisco, CA (US)

(72) Inventors: Terry Chong, Pleasanton, CA (US); Jameison Bear Martin, Oakland, CA (US); Thomas Fanghaenel, Oakland, CA (US); Andrew Tucker, Bellevue, WA (US); Nathaniel Wyatt, San Francisco, CA (US); Raghavendran Hanumantharau, Fremont, CA (US); Assaf Ben Gur, Livermore, CA (US); William Charles Mortimore, Jr., San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 17/562,387

(22) Filed: Dec. 27, 2021

(65) Prior Publication Data

US 2022/0121766 A1 Apr. 21, 2022

Related U.S. Application Data

(63) Continuation of application No. 16/263,751, filed on Jan. 31, 2019, now Pat. No. 11,238,174.

(51) Int. Cl.
*G06F 21/62* (2013.01)
*G06F 16/2455* (2019.01)
(Continued)

(52) U.S. Cl.
CPC .... *G06F 21/6218* (2013.01); *G06F 16/24552* (2019.01); *G06F 21/604* (2013.01); *H04L 9/08* (2013.01)

(58) Field of Classification Search
CPC .......... G06F 21/6218; G06F 16/24552; G06F 21/604; H04L 9/08
See application file for complete search history.

(56) References Cited

U.S. PATENT DOCUMENTS 9,081,805 B1 7/2015 Stamen
9,203,815 B1 * 12/2015 Bogorad ............... G06F 21/604
(Continued)

FOREIGN PATENT DOCUMENTS

CN 106663034 A 5/2017
CN 107003815 A 8/2017
(Continued)

OTHER PUBLICATIONS

International Search Report and Written Opinion for Application No. PCT/US2020/013169, dated Mar. 20, 2020, 12 pages.
(Continued)

*Primary Examiner* — Jason Chiang
(74) *Attorney, Agent, or Firm* — Butzel Long

(57) ABSTRACT

System and methods of the disclosed subject matter provide segregating, at a memory storage coupled to a multitenant database system, first tenant data of a first tenant from at least second tenant data of a second tenant, based on a first tenant identifier. A first encryption key associated with the first tenant may be retrieved from a key cache memory based on the first tenant identifier, to encrypt one or more fragments of the first tenant data. The fragments of the first tenant data may be encrypted based on the retrieved encryption key. Non-encrypted header information may be generated for each of the encrypted fragments of the first tenant
(Continued)

data, where the header information may have metadata including the first tenant identifier. The encrypted fragments of the first tenant data and the corresponding non-encrypted header information may be stored in the immutable storage.

28 Claims, 10 Drawing Sheets

(51) Int. Cl.
*G06F 21/60* (2013.01)
*H04L 9/08* (2006.01)

(56) References Cited

U.S. PATENT DOCUMENTS

| | | | | |
|---|---|---|---|---|
| 10,013,364 | B1* | 7/2018 | O'Brien | G06F 21/6218 |
| 10,152,487 | B1* | 12/2018 | Patwardhan | G06F 21/6218 |
| 10,296,757 | B2* | 5/2019 | Gupta | G06F 21/602 |
| 10,771,255 | B1* | 9/2020 | Roth | H04L 9/0819 |
| 2010/0198730 | A1* | 8/2010 | Ahmed | G06F 21/30 380/278 |
| 2010/0257351 | A1* | 10/2010 | O'Connor | G06F 21/606 713/150 |
| 2011/0289356 | A1* | 11/2011 | Hossain | G06F 11/3672 714/38.1 |
| 2012/0140923 | A1* | 6/2012 | Lee | H04L 9/0894 380/44 |
| 2012/0173589 | A1 | 7/2012 | Kwon | |
| 2014/0181992 | A1* | 6/2014 | Janson | G06F 21/60 726/27 |
| 2014/0330869 | A1 | 11/2014 | Factor | |
| 2014/0330936 | A1 | 11/2014 | Factor | |
| 2015/0043504 | A1 | 2/2015 | Kato | |
| 2015/0365385 | A1* | 12/2015 | Hore | H04L 63/0428 713/152 |
| 2016/0299924 | A1* | 10/2016 | Fujimoto | G06F 16/2455 |
| 2017/0046373 | A1* | 2/2017 | Baker | G06F 16/214 |
| 2017/0213210 | A1* | 7/2017 | Kravitz | G06Q 20/3829 |
| 2017/0364450 | A1* | 12/2017 | Struttmann | H04L 63/123 |
| 2018/0041336 | A1* | 2/2018 | Keshava | H04L 9/0891 |
| 2018/0041483 | A1* | 2/2018 | Smith | H04L 63/08 |
| 2018/0041491 | A1* | 2/2018 | Gupta | G06F 9/547 |
| 2018/0062835 | A1* | 3/2018 | Hamel | H04L 9/0894 |
| 2018/0196947 | A1* | 7/2018 | Davis | G06F 21/602 |
| 2018/0196955 | A1* | 7/2018 | Dageville | G06F 21/6218 |
| 2018/0205725 | A1* | 7/2018 | Cronkright | H04L 63/0838 |
| 2018/0307857 | A1 | 10/2018 | Beecham | |
| 2018/0351928 | A1* | 12/2018 | Yoo | H04L 63/064 |
| 2018/0373741 | A1 | 12/2018 | Martin | |
| 2019/0073152 | A1* | 3/2019 | Nagle | G06F 3/067 |
| 2019/0251198 | A1* | 8/2019 | Shamsutdinov | G06F 21/602 |
| 2019/0268148 | A1* | 8/2019 | Sun | H04L 9/302 |
| 2019/0332494 | A1* | 10/2019 | Natanzon | G06F 11/1448 |
| 2019/0384494 | A1* | 12/2019 | Abdul Rasheed | G06F 11/1448 |
| 2020/0034560 | A1* | 1/2020 | Natanzon | H04L 63/0442 |
| 2020/0053065 | A1* | 2/2020 | Wisniewski | H04L 63/06 |
| 2020/0167340 | A1* | 5/2020 | Cseri | G06F 16/2308 |
| 2020/0233877 | A1* | 7/2020 | Patel | G06F 16/2282 |

FOREIGN PATENT DOCUMENTS

| | | |
|---|---|---|
| CN | 107431712 A | 12/2017 |
| JP | 2012104121 A | 5/2012 |
| JP | 2013528872 A | 7/2013 |
| JP | 2017162242 A | 9/2017 |
| JP | 2018010576 A | 1/2018 |
| WO | 2017090142 A1 | 6/2017 |

OTHER PUBLICATIONS

International Preliminary Report on Patentability for App. No. PCT/US2020/013169, dated Aug. 12, 2021, 8 pages.
Japanese Office Action (with English translation) issued in App. No. JP2021-504785, dated May 10, 2022, 18 pages.
Chinese Notice of Allowance issued in App. No. CN20208004324, dated May 16, 2023, 6 pages.
Sebastian Jeuk, Towards Cloud, Service and Tenant Classification for Cloud Computing, 2014 14th IEEE/ACM International Symposium on Cluster, Cloud and Grid Computing, May 29, 2014.
https://www.soft256.com/multi-tenant-data-architecture, Jul. 18, 2018.
Extended European Search Report issued in App. No. EP23163116, dated Aug. 8, 2023, 8 pages.

* cited by examiner

SYSTEMS AND METHODS OF DATABASE ENCRYPTION IN A MULTITENANT DATABASE MANAGEMENT SYSTEM

CROSS-REFERENCE TO RELATED APPLICATIONS

This application is a continuation of U.S. patent application Ser. No. 16/263,751, filed Jan. 31, 2019, the entire contents of which are incorporated herein by reference.

BACKGROUND

Some present multitenant database systems may provide encryption of tenant data. However, such encryption is performed by an application that is separate from the database. That is, the application encrypts the tenant data, and the encrypted tenant data is transmitted to the database for storage. With this arrangement, typical database functions such as filtering, sorting, indexing, or the like cannot be performed on the encrypted data. That is, in present multitenant database systems, encryption of particular data in the multitenant database will impose restrictions on the use of the database. In some instances, attempting to perform typical database functions with the encrypted data will break the functionality for the application being used. Although traditional single tenant database systems may allow for encryption of tenant data, they cannot handle different encryption for different tenants. Some database systems provide tenant encryption, but require tenant data to be logically separated into different databases, tablespaces, or the like.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
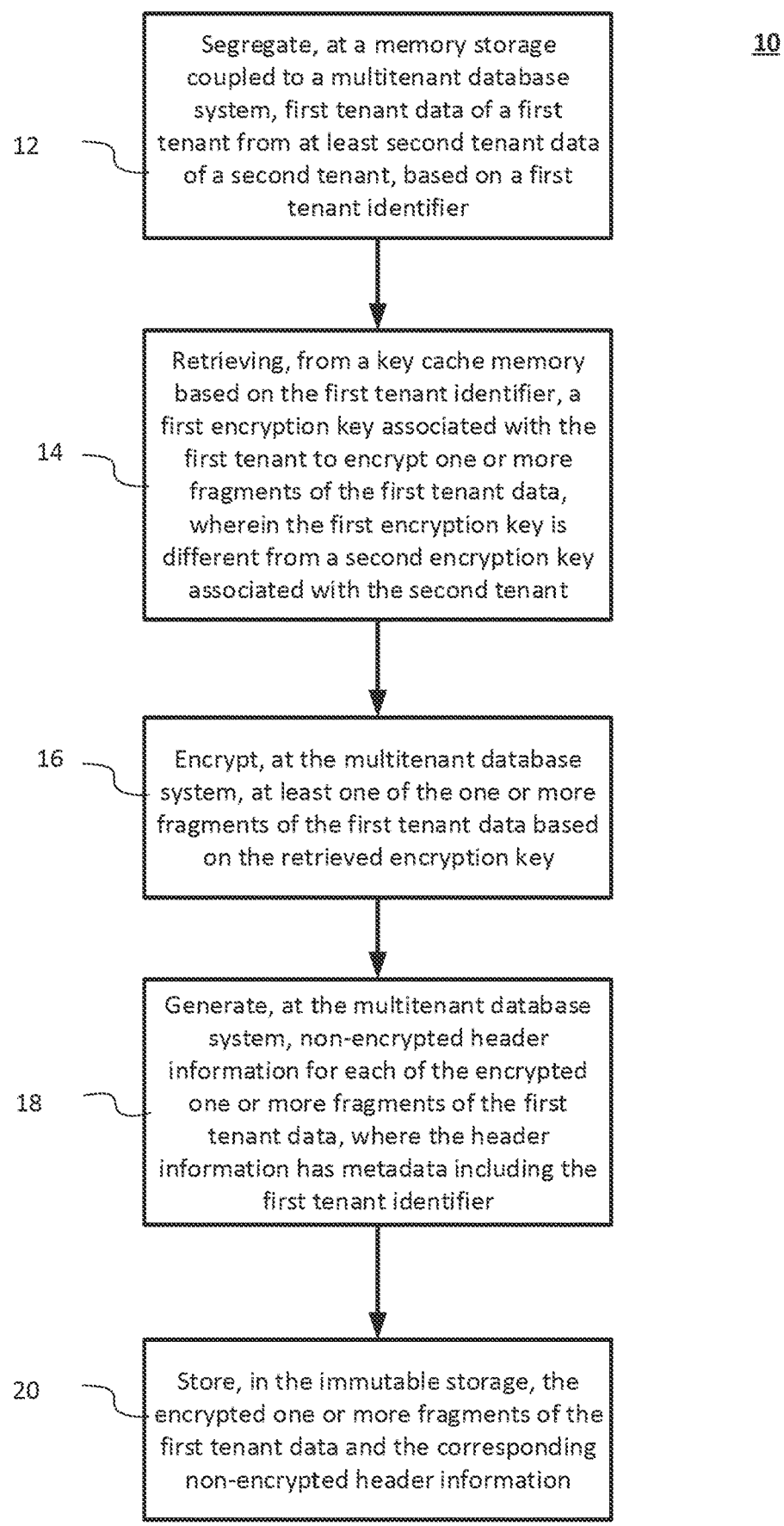
FIG. 1 shows an example method of segregating first and second tenant data and encrypting one or more fragments of first tenant data according to an implementation of the disclosed subject matter.

Implementations of the disclosed subject matter provide encryption for multitenant database systems, where database operations such as filtering, sorting, and indexing, and the like for tenant data that is stored in an encrypted form are supported. Encryption of the tenant data may be performed by the multitenant database system, rather than at an application server, so that database operations (e.g., filtering, sorting, and the like) may be utilized. Each tenant of the multitenant database system may be separately encrypted, where each tenant has its own tenant identifier and encryption key. In the multitenant database system, portions of different tenant data may logically belong to at least one of the same database object.

In particular, fragments which contain records of tenant data for a particular tenant may be encrypted. Fragments may be the basic data unit in the multitenant database system of the disclosed subject matter, with multiple fragments making up an extent. The data extents may include one or more fragments of tenant data and block indices. Fragments may be segregated based on a tenant identifier, and the segregated fragments may be individually encrypted using the encryption key for the tenant of that fragment.

Implementations of the disclosed subject matter improve upon present multitenant database systems, where tenant encryption is performed at the application level (i.e., at an application server). That is, in such systems, the encryption of tenant data is performed by the application before the tenant data is stored in a separate database system. A disadvantage of encrypting the data at the application is that database operations, such as filtering, sorting, indexing, or the like, cannot typically be performed. Applications may experience failure and/or errors when attempting database operations (e.g., filtering, sorting, and the like) when tenant data encoded by the application and stored in the multitenant database. That is, in present multitenant database systems, encryption of particular data in the multitenant database will impose restrictions on the use of the database. Although some traditional single-tenant database systems may allow for encryption of tenant data, they cannot handle different encryption for different tenants.

In implementations of the disclosed subject matter, a memory storage of the multitenant database system of the disclosed subject matter may include both committed and uncommitted transactions that have not been written to persistence in the multitenant database. The committed transactions may be encrypted before being written to persistence in an immutable storage of the multitenant database system. In some implementations, the multitenant database system use a daemon to manage the segregation of tenant data of the transactions to be committed into fragments. That is, different tenants (i.e., tenants having different tenant identifiers) may be segregated. A key cache may store encryption keys for each tenant. Keeping copies of the encryption keys in key cache may reduce the time overhead of retrieving the encryption keys from a Key Management System (KMS).

The daemon of the multitenant database system may retrieve an encryption key for a tenant to manage the encryption of the fragments of data of a particular tenant. A non-encrypted header may be generated and associated with each of the encrypted fragments of tenant data, where the header may include metadata having a tenant identifier (which may be used to retrieve an encryption key for a tenant, when authorized). The daemon may manage the writing of the encrypted fragments of tenant data and the readable headers to persistence at the immutable storage of the multitenant database system.

When a query is received by the multitenant database system for particular tenant data, a block cache is initially checked by the query engine of the multitenant database system to determine if the data is unencrypted and available, as this is quicker than retrieving it from the database. The query engine of the multitenant database system may operate to retrieve tenant data when the data in the block cache is unencrypted (i.e., the data is plain text, and not cypher text). If the data is not available in block cache, the requested tenant data may be retrieved from immutable storage where it is stored in encrypted form. The tenant data may be decrypted and provided to the block cache so that it may be used by the query engine to perform a database operation (e.g., filter, sort, or the like). In particular, the multitenant database system may retrieve the metadata having the tenant identifier from the header of the data fragment of the tenant data identified by the query engine, and may retrieve the encryption key from the key cache or the KMS to decrypt the data fragment based on the retrieved metadata. The requestor may be authenticated (e.g., via certificate) before it may retrieve the encryption key for a particular tenant from the key cache or the KMS. The decrypted data fragment (which has been decrypted from cypher text to plain text) may be provided to the block cache to perform database operations.

That is, implementations of the disclosed subject matter may encrypt tenant data with encryption keys that are specific to each tenant. Fragments of tenant data may be encrypted and stored in the immutable storage of the multitenant database system. Encrypted tenant data may be retrieved from the immutable storage based on metadata in a non-encrypted header. The retrieved encrypted data may be decrypted using a key retrieved from the key cache or KMS, and the decrypted data may be provided to the block cache, where database operations may be performed. Cross-tenant data (e.g., block indices, transaction logs, and the like that include one or more tenants) may be encrypted and decrypted using a system encryption key that is different from any of the tenant encryption keys. Implementations of the disclosed subject matter provide encryption of individual tenant data, and allow for database operations such as filtering, sorting, and the like to be performed by the multitenant database system without errors or failure typically associated with standard multitenant database systems.

Implementations of the disclosed subject matter may provide key management for tenant encryption, such as rotation of keys that are managed by the multitenant database system. The key management may include management of tenant encryption keys, system encryption keys to encrypt cross tenant data, and/or creation and deletion of encryption keys. In some implementations, encryption keys (e.g., tenant encryption keys and/or system encryption keys) may be rotated (i.e., changed) at a predetermined cadence to maintain security. In some implementations, users may request key rotation (for security purposes), and the data may be re-written as a new version with the new key in a separate data extent.

Implementations of the disclosed subject matter may provide encryption of data for one or more sandbox tenants. As sandboxed data is backed by the original tenant's physical data, the sandbox and the original tenant may share the same encryption key. A different key may be selected for the sandbox after creation. One or more sandbox tenants may be formed from original tenant data or from another sandbox tenant data.

Implementations of the disclosed subject matter may provide encryption for tenant migration, where encrypted tenant data may be transferred from one multitenant database instance to a different multitenant database instance. Encryption of the data may be maintained by providing encryption key replication. That is, the encryption key of the tenant to be migrated may also be migrated.

FIG. 1 shows an example method 10 of segregating first and second tenant data in a multitenant database system and encrypting one or more fragments of first tenant data according to an implementation of the disclosed subject matter. Method 10 may manage security of at least a portion of first tenant data of a first tenant of a multitenant database system (e.g., the multitenant database system 100 shown in FIG. 6, the multitenant database system 200 shown in FIG. 8, and central component 700 and/or a second computer 800 shown in FIG. 9, and/or database systems 1200a-1200d shown in FIG. 10) that may store at least the first tenant data of the first tenant and second tenant data for a second tenant.

The first tenant data of the first tenant may be typically stored in an immutable storage (e.g., immutable storage 108 shown in FIG. 6 and FIG. 8) of the multitenant database system associated with a first tenant identifier, and second tenant data of the second tenant may be typically stored in the immutable storage of the multitenant database system associated with a second tenant identifier. In some implementations, the first tenant data and the second tenant data may be stored in: a memory storage 102, and/or block cache 118 shown in FIG. 6; database server 208, 210 shown in FIG. 8; fixed storage 630, memory 670, removable media 650, central component 700, and/or storage 810 shown in FIG. 9; and/or database systems 1200a-1200d shown in FIG. 10.

First tenant data and/or second tenant data for both committed and/or uncommitted transaction may be stored in may be stored in memory storage (e.g., memory storage 102 shown in FIG. 6) coupled to the multitenant database system. At operation 12, the first tenant data of the first tenant from at least the second tenant data of the second tenant may be segregated at a memory storage coupled to the multitenant database system, based on the first tenant identifier. Committed transactions of the first tenant data may be segregated from uncommitted transaction data of the first tenant and/or the second tenant data that may be committed and/or uncommitted.

In some implementations, the committed transactions of the first tenant data may be encrypted before being written to persistence at the immutable storage. A daemon of a multitenant database system may manage the segregation of the first tenant data from the second tenant data, and forming one or more fragments of the first tenant data. The daemon may be executed by the multitenant database system 100 shown in FIG. 6, the database servers 208, 210 of the multitenant database system 200 shown in FIG. 8, the central component 700 and/or the second computer 800 shown in FIG. 9, and/or database systems 1200a-1200d shown in FIG. 10.

At operation 14 shown in FIG. 1, a first encryption key associated with the first tenant may be retrieved from a key cache memory (e.g., key cache 208, 212 shown in FIG. 8) based on the first tenant identifier. The retrieved first encryption key may be used to encrypt one or more fragments of the first tenant data. The first encryption key associated with the first tenant may be different from a second encryption key associated with the second tenant. Keeping copies of the encryption keys in key cache may reduce the time overhead of retrieving the keys from a Key Management System (KMS) (e.g., KMS 128 shown in FIG. 6 and FIG. 8). The daemon may retrieve an encryption key for the first tenant to manage the encryption of the fragments of the first tenant data.

In some implementations, access may need to be granted to a requestor of the first encryption key associated with the first tenant in order to retrieve the first encryption key from cache memory. The requestor may be, for example, application server 202, 204 shown in FIG. 8, and/or computer 600 shown in FIG. 9. For example, the requestor may provide a certificate or other identifying information to be authenticated. When the requestor has been authenticated, the requestor may receive the first encryption key to encrypt the one or more fragments of the first tenant data. In some implementations, database servers 208, 210 shown in FIG. 8, central component 700 and/or second computer 800 shown in FIG. 9, and/or database systems 1200a-1200d shown in FIG. 10 may authenticate the requestor.

At operation 16, the multitenant database system may encrypt the one of the one or more fragments of the first tenant data based on the retrieved encryption key. In some implementations, the daemon may manage the encryption of the one or more fragments of the first tenant data using the retrieved first encryption key.

Non-encrypted header information for each of the encrypted one or more fragments of the first tenant data may be generated at the multitenant database system at operation 18. The header information for the first tenant may have metadata including the first tenant identifier. Each generated non-encrypted header information may be associated with respective fragments of the first tenant data. At operation 20, the encrypted one or more fragments of the first tenant data and the corresponding non-encrypted header information may be stored in the immutable storage (e.g., the immutable storage shown in FIGS. 6 and 8, storage 810 of second computer 800 shown in FIG. 9, database systems 1200a-d of FIG. 10, and the like). In some implementations, the operation 20 may be part of a "flush" operation (e.g., by flusher 106 shown in FIG. 6), where committed transactions of first tenant data are identified, encrypted, and stored in the immutable storage of the multitenant database system to increase the available storage space in the memory storage (e.g., the memory storage 102 shown in FIG. 6).

Figure 2A:
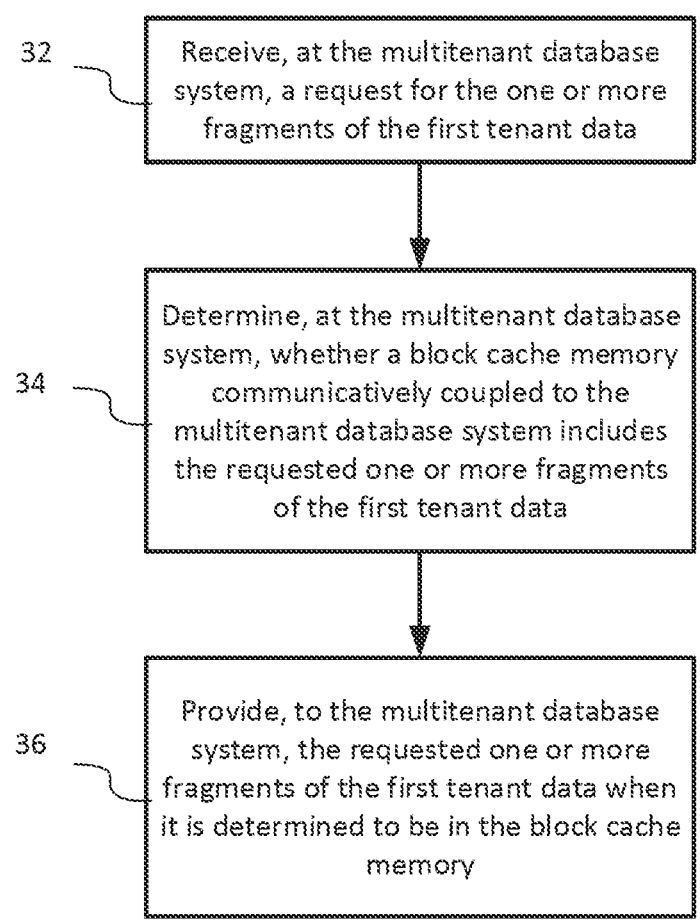
FIG. 2A shows an example method of retrieving non-encrypted fragments of the first tenant data in response to a database query request according to an implementation of the disclosed subject matter.

FIG. 2A shows an example method 30 of retrieving non-encrypted fragments of the first tenant data in response to a database query request according to an implementation of the disclosed subject matter. At operation 32, the multitenant database system (the multitenant database system 100 shown in FIG. 6, the multitenant database system 200 shown in FIG. 8, and central component 700 and/or a second computer 800 shown in FIG. 9, and/or database systems 1200a-1200d shown in FIG. 10) may receive a request for the one or more fragments of the first tenant data. The request may be from application server 202, 204 shown in FIG. 8 and/or computer 600 shown in FIG. 9, and may be received by queries 126 shown in FIG. 6. The multitenant database system may determine, at operation 34, whether a block cache memory (e.g., the block cache 122 shown in FIG. 6) communicatively coupled to the multitenant database system includes the requested one or more fragments of the first tenant data. At operation 36, the block cache memory may provide, to the multitenant database system, the requested one or more fragments of the first tenant data when it is determined to be in the block cache memory. In implementations of the disclosed subject matter, the contents of the block cache memory may be non-encrypted (i.e., in plain text, rather than cypher text). When the one or more fragments of the first tenant data are present in the block cache, database operations may be performed on the fragments of the first tenant data, and no decryption needs to be performed. Retrieval of the one or more fragments from the block cache may have the advantage of being faster than locating the encrypted one or more fragments in the immutable storage, retrieving the encryption key for the first tenant, decrypting the one or more fragments, and providing the decrypted fragments to the block cache.

Figure 2B:
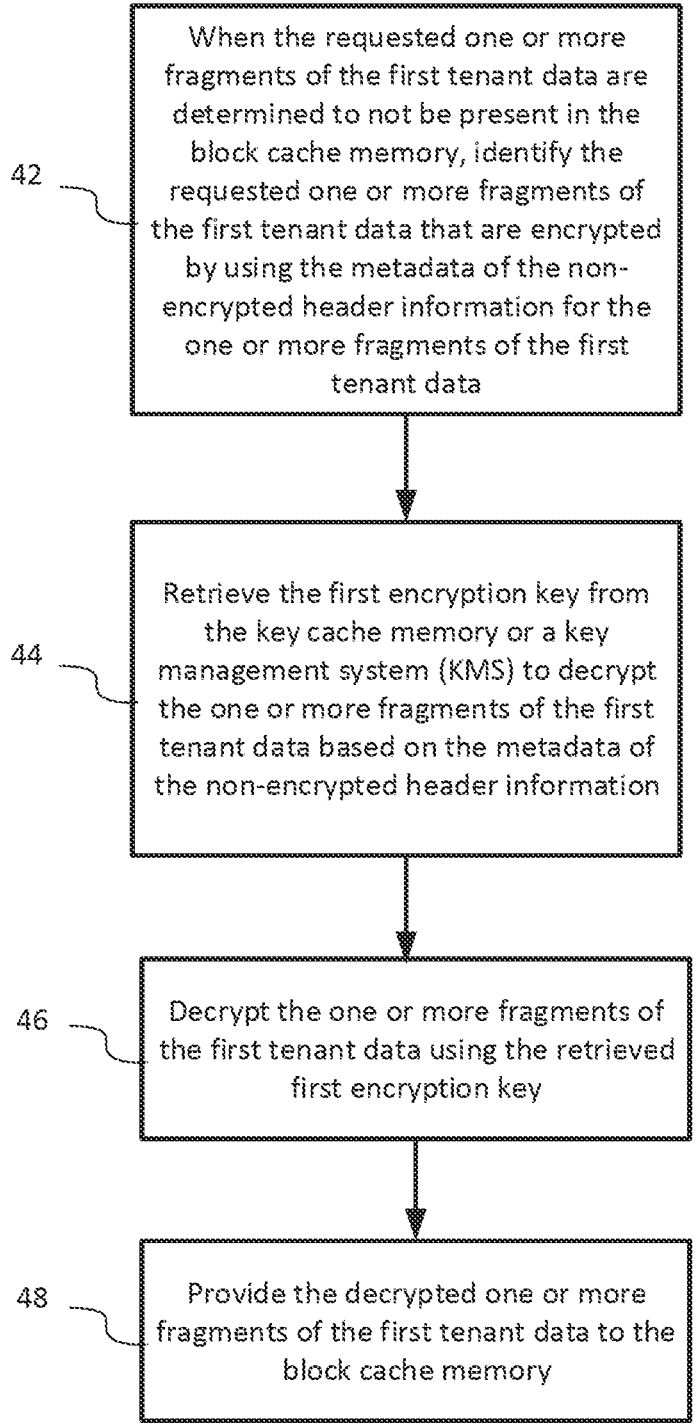
FIG. 2B shows an example method of retrieving and decrypting fragments of the first tenant data in response to a database query when the requested fragments are not present in block cache memory according to an implementation of the disclosed subject matter.

FIG. 2B shows an example method 40 of retrieving and decrypting fragments of the first tenant data in response to a database query when the requested fragments are not present in block cache memory according to an implementation of the disclosed subject matter. When the requested one or more fragments of the first tenant data are determined to not be present in the block cache memory (e.g., when the example method 30 shown in FIG. 2A may not find the unencrypted fragments of first tenant data in cache memory), the requested one or more fragments of the first tenant data that are encrypted may be identified in the immutable storage (e.g., the immutable storage 108 shown in FIGS. 6 and 8) at operation 42 by using the metadata of the non-encrypted header information for the one or more fragments of the first tenant data.

Figure 6:
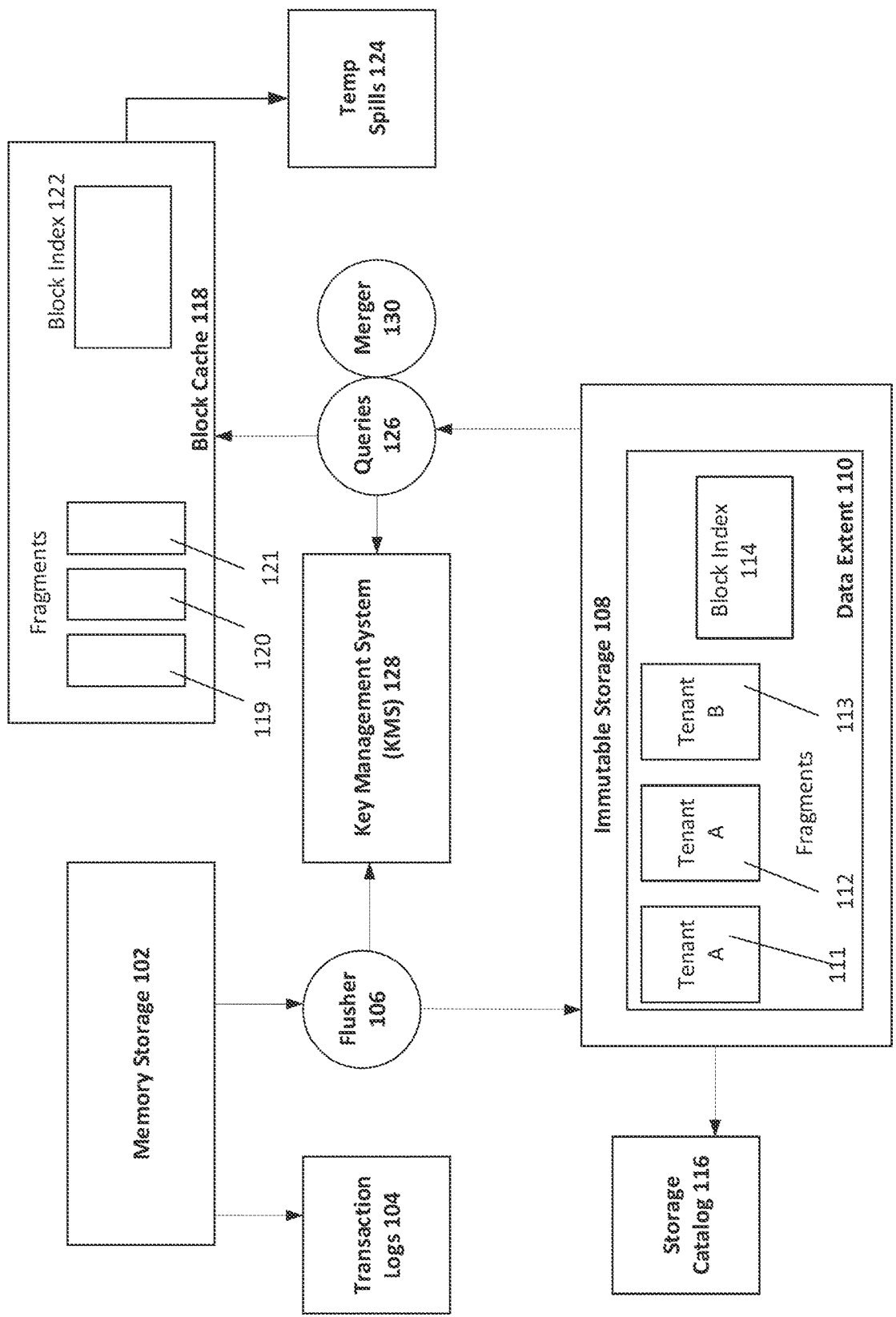
FIG. 6 shows an example of a system architecture that may be used in connection with segregating the example methods shown in FIGS. 1-5 according to implementations of the disclosed subject matter.

At operation 44, the first encryption key may be retrieved from the key cache memory (e.g., key cache shown in FIG. 8) or a key management system (KMS) (e.g., the KMS shown in FIG. 6 to decrypt the one or more fragments of the first tenant data based on the metadata of the non-encrypted header information. In some implementations, retrieval of the first encryption key from the key cache memory (e.g., key cache 208, 212 shown in FIG. 8) may be attempted. When the first encryption key is not present in the key cache memory, it may be retrieved from the KMS (e.g., KMS 128 shown in FIG. 6 and FIG. 8). The key cache memory or the KMS may grant access to the first encryption key associated with the first tenant when the requestor is authenticated. For example, the requestor may provide a certificate or other identifying information to be authenticated. When the requestor has been authenticated, the requestor may receive the first encryption key to decrypt the one or more fragments of the first tenant data.

At operation 46, the one or more fragments of the first tenant data may be decrypted using the first encryption key that is retrieved from the key cache memory or KMS. At operation 48, the decrypted one or more fragments of the first tenant data may be provided to the block cache memory (e.g., block cache 118 shown in FIG. 6).

When the one or more fragments are decrypted (e.g., the data is in plain text form) and are present in the block cache memory, one or more database operations, such as filtering, sorting, and/or indexing may be performed on the one or more fragments of the first tenant data by the multitenant database system. That is, implementations of the disclosed subject matter may encrypt tenant data in a multitenant database system and perform database operations, unlike some traditional multitenant systems, where database operations may be limited or unavailable when tenant data is encrypted. Although some traditional databases may support tenant encryption, they require tenants to be logically separated into different databases or tablespaces. In the multitenant database system of the disclosed subject matter, tenants may be collocated within same database, or collocated as database objects (e.g., in the same tables and/or indexes), and perform database operations on data that may be stored in encrypted form.

In some implementations, the multitenant database system may encrypt one or more of an index of the multitenant database (e.g., block index 114 of the data extent 110 and/or block index 122 of the block cache 118 shown in FIG. 6), and/or a transaction log (e.g., transaction logs 104 shown in FIG. 6) using a system key that is separate from the first encryption key and the second encryption key, and is not associated with the first tenant and the second tenant. As discussed in detail below, the storage catalog 116 and the temp spills 124 shown in FIG. 6 may also be encrypted using a system key that is separate from the tenant encryption keys.

Figure 3:
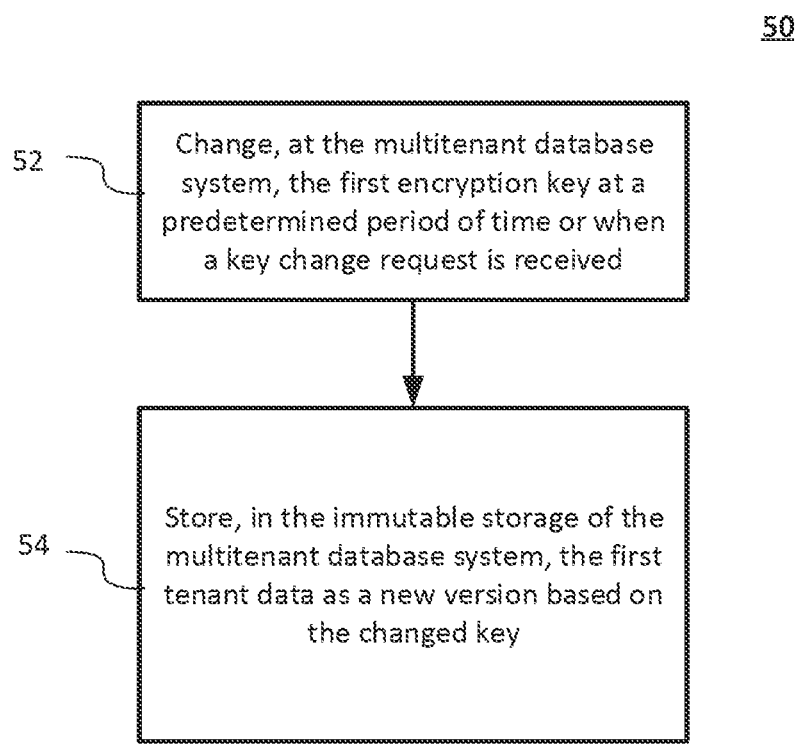
FIG. 3 shows an example method of changing a first encryption key associated with the first tenant data and storing the first tenant data as a new version in the immutable storage based on the changed key according to an implementation of the disclosed subject matter.

FIG. 3 shows an example method 50 of changing a first encryption key associated with the first tenant data and storing the first tenant data as a new version in the immutable storage based on the changed key according to an implementation of the disclosed subject matter. At operation 52, the multitenant database system (e.g., the multitenant database system 100 shown in FIG. 6, the multitenant database system 200 shown in FIG. 8, and central component 700 and/or a second computer 800 shown in FIG. 9, and/or database systems 1200*a*-1200*d* shown in FIG. 10) may change the first encryption key at a predetermined period of time or when a key change request is received. The immutable storage (e.g., immutable storage 108 shown in FIGS. 6 and 8) of the multitenant database system may store the first tenant data as a new version in the based on the changed key at operation 54. The periodic change of the encryption key may be used to maintain security of the encrypted tenant data.

In implementations of the disclosed subject matter, a sandbox tenant may be created based upon existing non-sandbox tenant data, for example as disclosed in U.S. Patent Pub. No. 2018/0129585, the disclosure of which is incorporated by reference in its entirety. In some implementations, one or more new sandboxes may be created from an original sandbox, for example, as disclosed in U.S. patent application Ser. No. 16/133,106, the disclosure of which is incorporated by reference in its entirety. For example, the original sandbox may be a sandbox that is created from original tenant data of an original tenant. The original sandbox may be formed from a template to include one or more of code, schema, records, and test data from at least one data source. Verification testing of the code and/or test data may be performed prior to sandbox duplication. One or more duplicate sandboxes may be created having the same contents.

In implementations of the described subject matter, a combination of hardware and software can create a correspondence between certain sandbox tenant identifiers and original tenant identifiers to provide the sandbox tenant read access to point in time data associated with the original tenant. In this way, the sandbox tenant can use original tenant data without having to copy the original tenant data to the sandbox tenant's namespace. Similarly, a correspondence between one or more new sandbox tenant identifiers and an original sandbox tenant identifier may provide the new sandbox tenants read access to point in time data associated with the original sandbox tenant.

New transaction data generated by the sandbox tenant can be written to the sandbox tenant namespace not accessible to the original tenant. New transaction data generated by the original tenant can be written to original tenant namespace not accessible to the sandbox tenant. In this way, new sandbox tenant data does not corrupt original tenant data, and new original tenant data (e.g., which may be referred to as subsequent immutable original tenant data) does not corrupt the test data being read and written by the sandbox to test the application. Similarly, new transaction data generated by the at least one sandbox tenant can be written to the at least one sandbox tenant namespace not accessible to the original sandbox tenant. New transaction data generated by the original sandbox tenant can be written to original sandbox tenant namespace not accessible to the at least one new sandbox tenant. The at least one new sandbox tenant data does not corrupt original sandbox tenant data, and new original sandbox tenant data does not corrupt the test data being read and written by the at least one new sandbox to test the application. These implementation can be used with a relational database that stores persistent contents of records, e.g., in a Log Structured Merge (LSM) tree.

Figure 4:
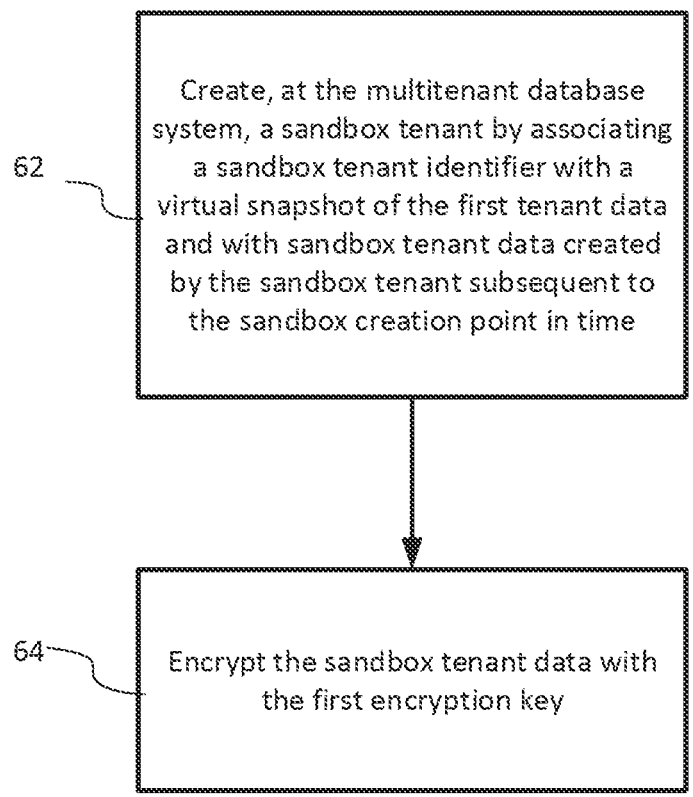
FIG. 4 shows an example method of creating at least one new sandbox for at least one new sandbox tenant data from the first tenant data of the first tenant, and encrypting the sandbox tenant data according to an implementation of the disclosed subject matter.

FIG. 4 shows an example method 60 of creating at least one new sandbox for at least one new sandbox tenant data from the first tenant data of the first tenant, and encrypting the sandbox tenant data according to an implementation of the disclosed subject matter. At operation 62, the multitenant database system (e.g., the multitenant database system 100 shown in FIG. 6, the multitenant database system 200 shown in FIG. 8, and central component 700 and/or a second computer 800 shown in FIG. 9, and/or database systems 1200*a*-1200*d* shown in FIG. 10) may create a sandbox tenant by associating a sandbox tenant identifier with a virtual snapshot of the first tenant data and with sandbox tenant data created by the sandbox tenant subsequent to the sandbox creation point in time. At operation 64, the sandbox tenant data may be encrypted with the first encryption key. The sandbox tenant and/or encrypted sandbox tenant data may be stored in the immutable storage (e.g., immutable storage 108 shown in FIG. 6 and FIG. 8). In some implementations, the multitenant database system may select a new key for the sandbox tenant after the sandbox tenant is created.

Figure 5:
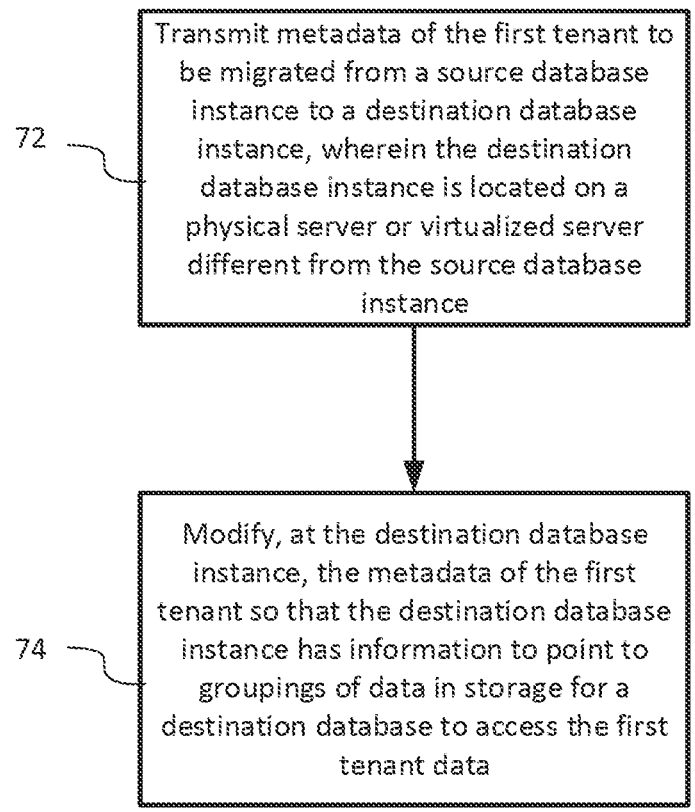
FIG. 5 shows an example method of migrating the first tenant data from a source database instance to a destination database instance using the metadata of the first tenant data according to an implementation of the disclosed subject matter.

FIG. 5 shows an example method of migrating the first tenant data from a source database instance to a destination database instance using the metadata of the first tenant data. Implementations of the disclosed subject matter can migrate a tenant of the multitenant database system from a source database instance to a destination database instance without requiring row-by-row data copying, duplication of production data or operation on duplicated production data. The migration can be completed faster than conventional tenant migration techniques and at lower cost in terms of processor resources, data storage and persistence resources, and/or datapath (e.g., communication network) resources. In many cases, no consistency checks or other corrective measures need to be taken with respect to the migrated data, thereby saving additional time and system resources. The migration of tenant data from a source database instance to a destination database may be described in detail, for example, in U.S. Patent Publn. No. 2018/0373708, the disclosure of which is incorporated by reference in its entirety.

Figure 8:
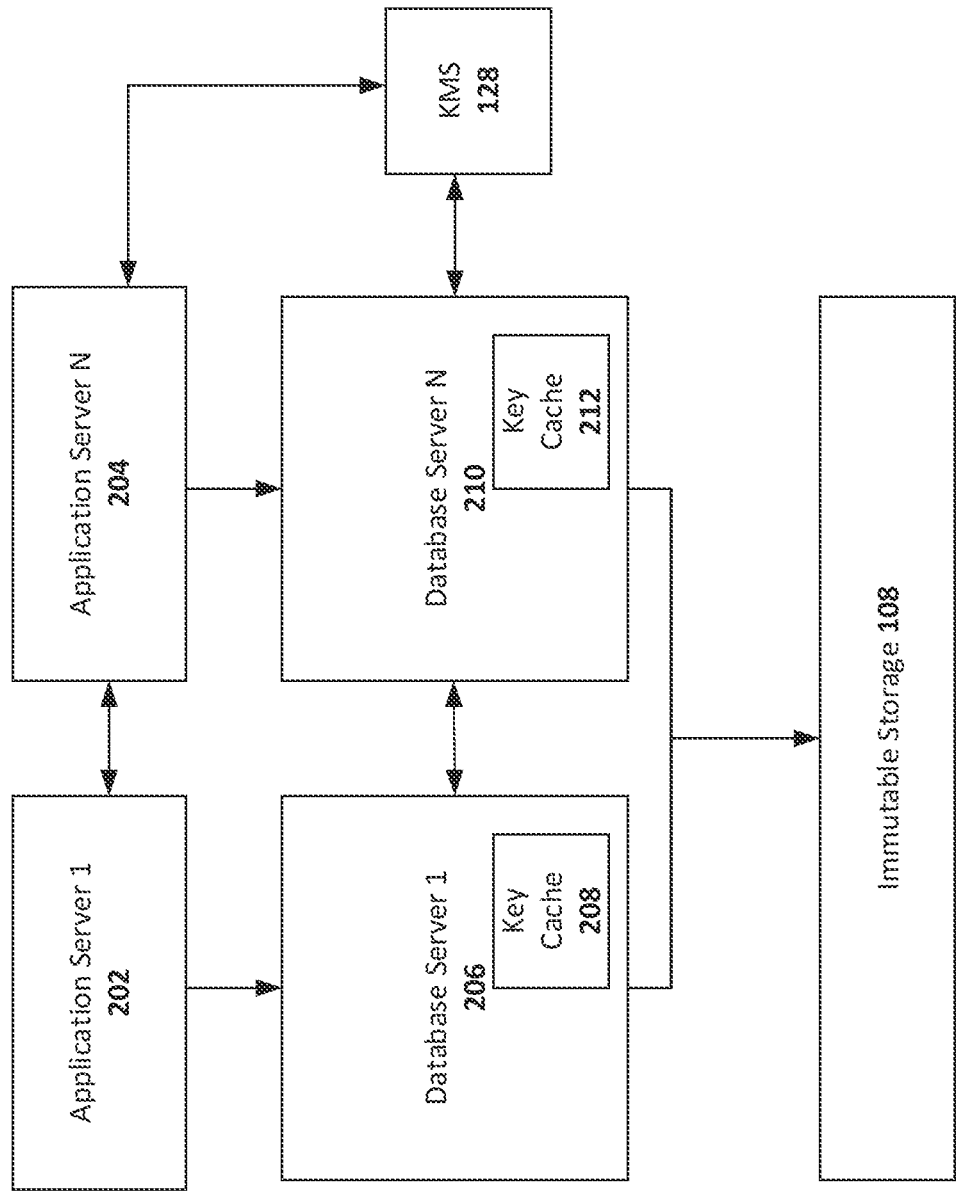
FIG. 8 shows an example architecture for key management according to implementations of the disclosed subject matter.

At operation 72 shown in FIG. 5, the metadata of the first tenant to be migrated from a source database instance (e.g., database server 208 shown in FIG. 8) may be transmitted to a destination database instance (e.g., database server 210 shown in FIG. 8). The destination database instance may be located on a physical server or virtualized server different from the source database instance. At operation 74, the metadata of the first tenant at the destination database instance may be modified the so that the destination database instance has information to point to groupings of data in storage for a destination database to access the first tenant data. The migrated tenant data may retain its encryption, and the encryption key may be migrated with the tenant data. The migrated tenant data may be stored in the immutable storage (e.g., immutable storage 108 shown in FIG. 8). In some implementations, the multitenant database system may select a new key for the migrated tenant data after the data is migrated.

FIG. 6 shows an example of a system architecture of a multitenant database system 100 that may be used in connection with segregating the example methods shown in FIGS. 1-5 according to implementations of the disclosed subject matter.

The multitenant database system 100 may be a database system, server system, cloud server system, or the like. The memory storage 102 may be any suitable combination of hardware and software of the system 100 for storing committed and/or uncommitted transaction data for the first tenant and/or the second tenant (e.g., first tenant data and/or second tenant data). In some implementations, the memory storage 102 may be semiconductor memory, a solid state drive (SSD), hard disk drive, optical memory, an optical storage device, or any other suitable physical data storage medium, or some combination thereof. The tenant data stored in the memory storage 102 may be unencrypted data.

Transaction logs 104 may be any suitable combination of hardware and software of the system 100 for storing any operation and/or change to the database system (e.g., retrieval of data, committing a transaction, flushing of data, storing of data, and the like). Each transaction performed on tenant data in the memory storage 102 may be stored in the transaction logs 104. The transaction logs 104 may be encrypted using a system encryption key that may not belong to any specific tenant.

Flusher 106 may be any suitable combination of hardware and software of the system 100 to store committed transactions stored in the memory storage 102 in a data extent (e.g., data extent 110) to the immutable storage 108. The immutable storage 108 may be physical data storage, such as semiconductor memory, a solid state drive (SSD), hard disk drive, optical memory, an optical storage device, or any other suitable physical data storage medium, or some combination thereof.

When committed tenant data (e.g., first tenant data) stored in the memory storage 102 is to be stored in the immutable storage 108, the flusher 106 may retrieve an encryption key (e.g., the first encryption key) from a key cache (e.g., key cache shown in FIG. 8) or the key management system 128 to encrypt the data, and store it in a data extent (e.g., data extent 110) of the immutable storage 108. In some implementations, the tenant data may be compressed before being encrypted and stored in the immutable storage 118.

The data extent 110 may include fragments of tenant data 111, 112, and 113. As shown in FIG. 6, the fragment of tenant data 111 and the fragment of tenant data 112 may be for the first tenant (e.g., tenant A), and the fragment of tenant data 113 may be for the second tenant (e.g., tenant B). Each of the fragments of tenant data 111, 112, and 113 may only include records for a single tenant. The fragments of tenant data 111 and 112 for a first tenant may be encrypted with a first encryption key, and the fragment of tenant data 113 for the second tenant may be encrypted with a second encryption key. The block index 114 may include index numbers of a database table in immutable storage 108 of the fragments of tenant data 111, 112, and 113 to indicate their location in the database table. The block index 114 may be encrypted with a system encryption key that may not belong to any specific tenant.

The storage catalog 116 may be communicatively coupled to the immutable storage, and may be any suitable combination of hardware and software of the system 100 for storing data extents (such as data extent 110) and extent references. For example, the storage catalog may be the memory storage 102 may be semiconductor memory, a solid state drive (SSD), hard disk drive, optical memory, an optical storage device, or any other suitable physical data storage medium, or some combination thereof. An extent reference may be used as a logical reference to a physical extent that is stored in physical storage (e.g., a storage device), and may be used to virtualize access to the physical storage. The data extents may include one or more fragments of tenant data (e.g., fragments of tenant data 111, 112, and 113, and the like) and block indices. The storage catalog 116 may be encrypted using a system encryption key that may not belong to any specific tenant.

The block cache 118 may be a semiconductor memory, a solid state drive (SSD), hard disk drive, optical memory, an optical storage device, or any other suitable physical data storage medium, or some combination thereof. The block cache 118 may include may include fragments of tenant data 119, 120, and 121. Each of the fragments of tenant data 119, 120, and 121 may only include records for a single tenant. The fragments of tenant data 119, 120, and 121 may be unencrypted (i.e., plain text). The block index 122 may include index numbers of the fragments of tenant data 119, 120, and 120 to indicate their location in a table. The block index 122 may be unencrypted. As described above in connection with FIGS. 1-2B, database operations, such as filtering, sorting, indexing, or the like, may be performed on the nonencrypted data in the block cache 118.

Temp spills 124 may be a semiconductor memory, a solid state drive (SSD), hard disk drive, optical memory, an optical storage device, or any other suitable physical data storage medium, or some combination thereof to handle overflow of data stored in the block cache 118. That is, when the data size of the fragments of tenant data 119, 120, and 121 and/or the block index 122 exceeds a data capacity of the block cache 118, the temp spills 124 may store overflow data (e.g., data that does not fit in block cache 118 because the data capacity may be exceeded). The data capacity of the block cache 118 may be increased when transactions are written to memory storage 102 (where committed transactions may be flushed to the immutable storage 108). The fragments of tenant data and/or block index data stored in temp spills may be unencrypted.

Queries 126 may be received by the multitenant database system 100 by for example, one or more applications and/or application servers (e.g., application server 202 and/or application server 204 shown in FIG. 8) requesting tenant data that may be stored as unencrypted tenant data in the memory storage 102 and/or the block cache 118, and/or that may be stored as encrypted tenant data in the immutable storage 108. In some implementations, a daemon of the multitenant database system 100 may determine whether the requested tenant data is present in the block cache 118. If the requested tenant data is not present in the block cache 118, and is encrypted and stored in the immutable storage 118, an encryption key (e.g., the first encryption key for the first data) may be retrieved from a key cache (e.g., key cache shown in FIG. 8) or from the key management system 128 as described above in connection with FIGS. 2A-2B to decrypt the tenant data and provide it to the block cache 118. The Merger 130 may be update existing records (and write them as new records) and/or generate new records in the multitenant database system 100.

Figure 7:
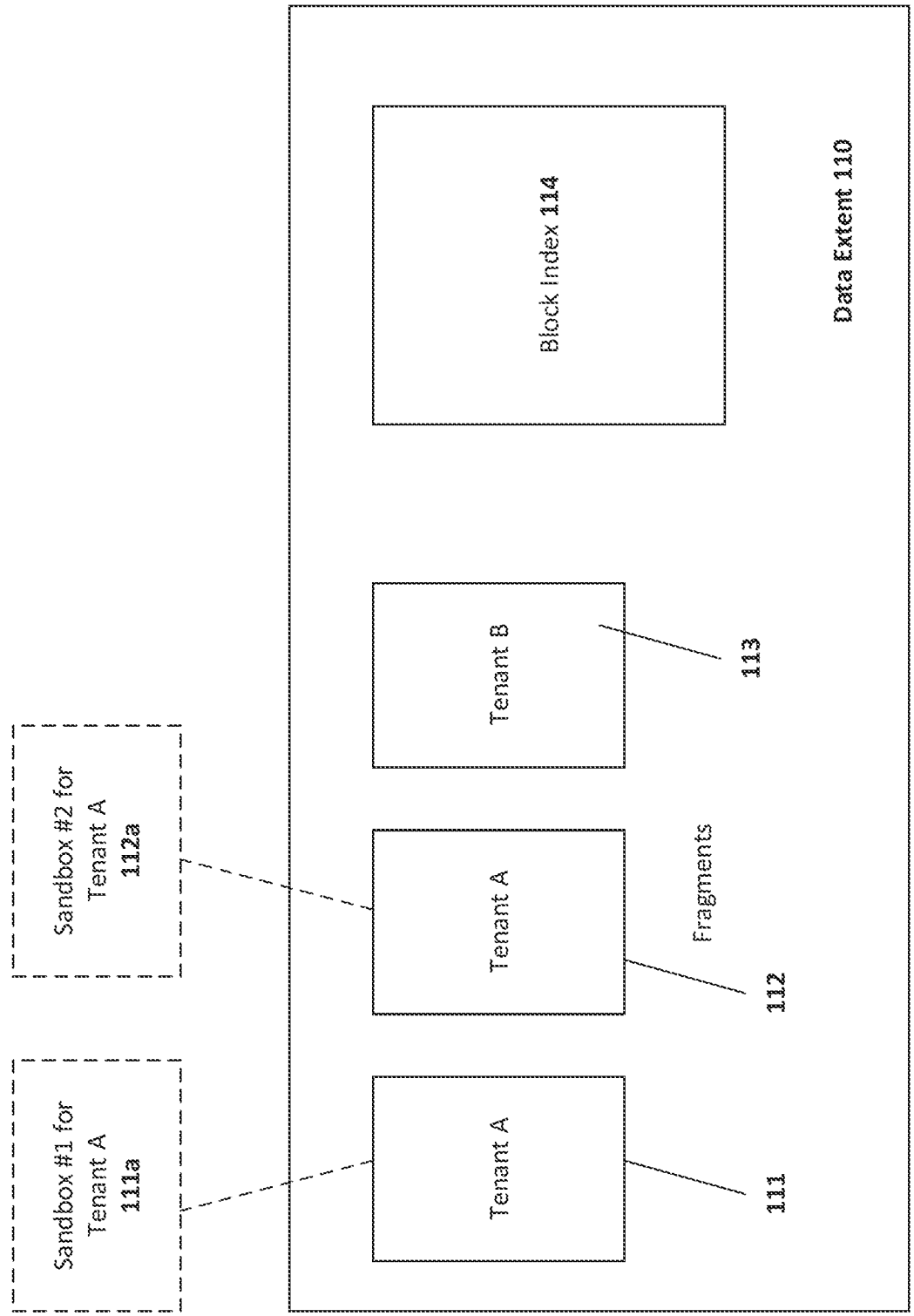
FIG. 7 shows an example architecture of creating different sandboxes for different fragments of the first tenant data using the example method shown in FIG. 4 according to an implementation of the disclosed subject matter.

FIG. 7 shows an example architecture of creating different sandboxes for different fragments of the first tenant data using the example method shown in FIG. 4 according to an implementation of the disclosed subject matter. In some implementations, at operation 62 shown in FIG. 4, the multitenant database system 100 may create a sandbox tenant by associating a sandbox tenant identifier with a virtual snapshot of the first tenant data (e.g., a fragment of first tenant data 111 shown in FIG. 7) and with sandbox tenant data (e.g., the sandbox tenant data for a first sandbox 111a for the first tenant) created by the sandbox tenant (e.g., sandbox tenant 1a1a) subsequent to a sandbox creation point in time. The sandbox tenant data of the sandbox tenant 111a may be encrypted with the first encryption key (e.g., the same encryption key as used to encrypt the fragments of the tenant data 111 of the first tenant) at operation 64 in FIG. 4.

In some implementations, the multitenant database system may select a new key for the sandbox tenant (e.g., the sandbox tenant 111a) after the sandbox tenant is created. The multitenant database system 100 may encrypt the sandbox tenant data of the sandbox tenant 111a using the new encryption key, and the re-encrypted data may be stored in data extents in the immutable storage 108. The newly-encrypted data may include the tenant data the data that the sandbox started with, as well as any sandbox data generated after the sandbox creation point in time.

In some implementations, multiple sandboxes may be created from the fragments of the first tenant data 111. In other implementations, the multitenant database system 100 may create a different sandboxes for different fragments of data for the same tenant (e.g., the first tenant). As shown in FIG. 7, fragments of the first tenant data 111 may be used to create a sandbox tenant 111a, and different fragments for the first tenant 112 may be used to create the sandbox tenant 112a.

FIG. 8 shows an example multitenant database system 200 with key management according to implementations of the disclosed subject matter. The system 200 may include one or more application servers, such as application server 202 and/or application server 204. Application server 202 and/or application server 204 may be physical servers, virtualized servers, and/or cloud server systems.

Application servers 202, 204 may execute one or more applications, issue queries and/or write requests to one or more database servers, such as database server 206 and/or database server 210. The database servers 206, 210 may be physical servers, virtualized servers, and/or cloud server systems. In some implementations, the database servers 206, 210 may include one or more of the memory storage 102, transaction logs 104, flusher 106, block cache 118, and/or temp spills 124 of system 100 shown in FIG. 6 and described above.

The database server 206 may include key cache 208, and database server 210 may include key cache 212. As described above, the key caches 208, 212 may store one or more encryption keys to encrypt and/or decrypt tenant data. The database servers 206, 210 may be communicatively coupled to the immutable storage 108, which is described in detail above in connection with FIG. 6.

The KMS 128 may be any suitable combination of hardware and software to generate, assign, store, manage, and/or retrieve encryption keys to encrypt and/or decrypt tenant data. For example, the KMS 128 may generate, assign, store, and/or retrieve an encryption key such as a first encryption key associated with the first tenant or a second encryption key associated with the second tenant. The KMS 128 may manage tenant encryption keys and/or system encryption keys (i.e., instance keys), which may be used to encrypt cross-tenant data (e.g., encryption key used to encrypt transaction logs 104, temp spills 124, storage catalog 116, and/or block index 114). In some implementations, the encryption keys, such as the first encryption key and/or the second encryption key may be stored in the KMS 128, which may include and/or be communicatively coupled to semiconductor memory, a solid state drive (SSD), hard disk drive, optical memory, an optical storage device, or any other suitable physical data storage medium, or some combination thereof. The KMS 128 may provide key lifecycle management, such as the rotation of keys, deletion of keys, usage monitoring of keys, and the like. The KMS 128 may support bring-your-own-key (BYOK) for one or more tenants that may be provided by the application server 202, 204.

Implementations of the presently disclosed subject matter may be implemented in and used with a variety of component and network architectures. In some implementations, the system architectures shown in FIG. 6 and FIG. 8, as described above, may be implemented using the components and network architectures shown in FIGS. 9-10.

Figure 9:
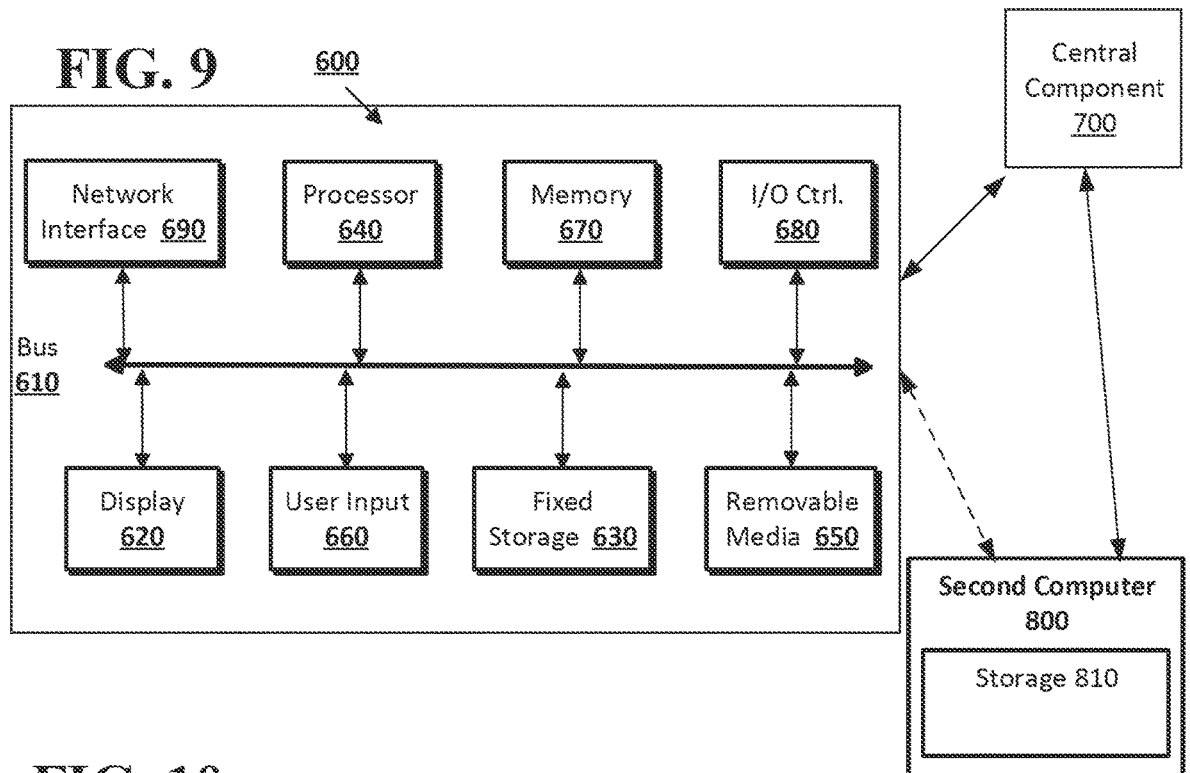
FIG. 9 shows a computer according to an implementation of the disclosed subject matter.

FIG. 9 is an example computer 600 suitable for implementing implementations of the presently disclosed subject matter. As discussed in further detail herein, the computer 600 may be a single computer in a network of multiple computers. As shown in FIG. 9, the computer 600 may communicate with a central or distributed component 700 (e.g., server, cloud server, database, cluster, application server, etc.). The central component 700 may communicate with one or more other computers such as the second computer 800, which may include a storage device 810. The second computer 800 may be a server, cloud server, or the like. The storage 810 may use any suitable combination of any suitable volatile and non-volatile physical storage mediums, including, for example, hard disk drives, solid state drives, optical media, flash memory, tape drives, registers, and random access memory, or the like, or any combination thereof.

Figure 10:
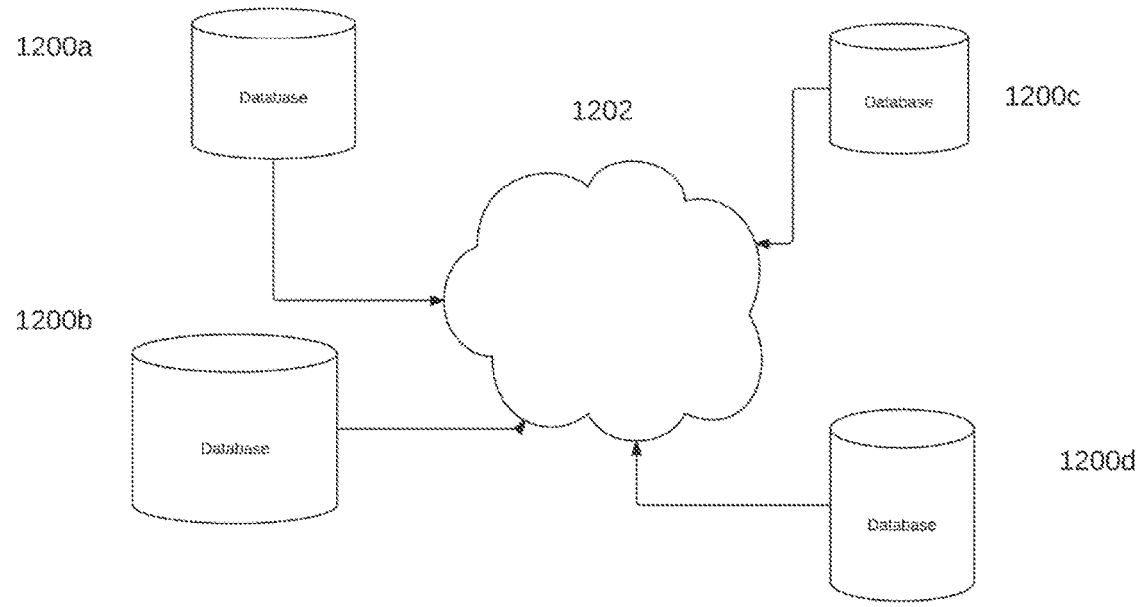
FIG. 10 shows a network configuration according to an implementation of the disclosed subject matter.

Data may be stored in any suitable format in, for example, the storage 810, using any suitable filesystem or storage scheme or hierarchy. For example, the storage 810 may store data using a log structured merge (LSM) tree with multiple levels. Further, if the systems shown in FIGS. 9-10 are multitenant systems, the storage may be organized into separate log structured merge trees for each instance of a database for a tenant. Alternatively, contents of all records on a particular server or system may be stored within a single log structured merge tree, in which case unique tenant identifiers associated with versions of records may be used to distinguish between data for each tenant as disclosed herein. For example, a unique tenant identifier may be associated with the first tenant, and a different identifier may be associated with the second tenant. More recent transactions may be stored at the highest or top level of the tree and older transactions may be stored at lower levels of the tree. Alternatively, the most recent transaction or version for each record (i.e., contents of each record) may be stored at the highest level of the tree and prior versions or prior transactions at lower levels of the tree.

The information obtained to and/or from a central component 700 may be isolated for each computer such that computer 600 may not share information with computer 800. Alternatively or in addition, computer 600 may communicate directly with the second computer 800.

The computer (e.g., user computer, enterprise computer, etc.) 600 includes a bus 610 which interconnects major components of the computer 600, such as a central processor 640, a memory 670 (typically RAM, but which may also include ROM, flash RAM, or the like), an input/output controller 680, a user display 620, such as a display or touch screen via a display adapter, a user input interface 660, which may include one or more controllers and associated user input or devices such as a keyboard, mouse, WiFi/cellular radios, touchscreen, microphone/speakers and the like, and may be closely coupled to the I/O controller 680, fixed storage 630, such as a hard drive, flash storage, Fibre Channel network, SAN device, SCSI device, and the like, and a removable media component 650 operative to control and receive an optical disk, flash drive, and the like.

The bus 610 enable data communication between the central processor 640 and the memory 670, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 600 can be stored on and accessed via a computer readable medium, such as a hard disk drive (e.g., fixed storage 630), an optical drive, floppy disk, or other storage medium 650.

The fixed storage 630 may be integral with the computer 600 or may be separate and accessed through other interfaces. A network interface 690 may provide a direct connection to a remote server via a telephone link, to the Internet via an internet service provider (ISP), or a direct connection to a remote server via a direct network link to the Internet via a POP (point of presence) or other technique. The network interface 690 may provide such connection using wireless techniques, including digital cellular telephone connection, Cellular Digital Packet Data (CDPD) connection, digital satellite data connection or the like. For example, the network interface 690 may enable the computer to communicate with other computers via one or more local, wide-area, or other networks, as shown in FIG. 10.

Many other devices or components (not shown) may be connected in a similar manner (e.g., data cache systems, application servers, communication network switches, firewall devices, authentication and/or authorization servers, computer and/or network security systems, and the like). Conversely, all of the components shown in FIG. 10 need not be present to practice the present disclosure. The components can be interconnected in different ways from that shown. The operation of a computer such as that shown in FIGS. 9-10 is readily known in the art and is not discussed in detail in this application. Code to implement the present disclosure can be stored in computer-readable storage media such as one or more of the memory 670, fixed storage 630, removable media 650, or on a remote storage location.

FIG. 10 shows an example network arrangement according to an implementation of the disclosed subject matter. Four separate database systems 1200a-d at different nodes in the network represented by cloud 1202 communicate with each other through networking links 1204 and with users (not shown). Each of database systems 1200 may be operable to host multiple instances of a database, where each instance is accessible only to users associated with a particular tenant (e.g., the first tenant, the second tenant, and the like). Each of the database systems may constitute a cluster of computers along with a storage area network (not shown), load balancers and backup servers along with firewalls, other security systems, and authentication systems. Some of the instances at any of systems 1200 may be live or production instances processing and committing transactions received from users or from computing elements (not shown) for ingesting and providing data for storage in the instances.

Further, a multitenant system may have various tenant instances on server systems distributed throughout a network with a computing system at each node. The live or production database instance of each tenant may only have its transactions processed at one computer system. The computing system for processing the transactions of that instance may also process transactions of other instances for other tenants.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
encrypting, at a multitenant database system having first tenant data of a first tenant and second tenant data of a second tenant, one or more fragments of the first tenant data based on a first encryption key associated with the first tenant;
encrypting, at the multitenant database system, cross-tenant data using a system encryption key that is different from the first encryption key and a second encryption key associated with the second tenant, wherein the cross-tenant data is data for the first tenant and the second tenant and includes at least block indices and transaction logs;
generating, at the multitenant database system, non-encrypted header information for each of the encrypted one or more fragments of the first tenant data, wherein the header information has metadata including a first tenant identifier; and
storing, in an immutable storage of the multitenant database system, the encrypted one or more fragments of the first tenant data and the corresponding non-encrypted header information, and storing the encrypted cross-tenant data.

2. The method of claim 1, wherein the encrypting the one or more fragments of the first tenant data further comprises:
segregating, at a memory storage coupled to the multitenant database system, the first tenant data of the first tenant from at least the second tenant data of the second tenant, based on the first tenant identifier.

3. The method of claim 1, wherein the encrypting the one or more fragments of the first tenant data further comprises:
retrieving, from a key cache memory based on the first tenant identifier, the first encryption key to encrypt one or more fragments of the first tenant data, wherein the first encryption key is different from the second encryption key.

4. The method of claim 1, wherein the first tenant data is for a committed transaction.

5. The method of claim 1, further comprising:
granting access to the first encryption key associated with the first tenant when a requestor is authenticated.

6. The method of claim 1, further comprising:
receiving, at the multitenant database system, a request for the one or more fragments of the first tenant data;
determining, at the multitenant database system, whether a block cache memory communicatively coupled to the multitenant database system includes the requested one or more fragments of the first tenant data; and
providing, to the multitenant database system, the requested one or more fragments of the first tenant data when it is determined to be in the block cache memory.

7. The method of claim 6, further comprising:
when the requested one or more fragments of the first tenant data are determined to not be present in the block cache memory, identifying the requested one or more fragments of the first tenant data that are encrypted by using the metadata of the non-encrypted header information for the one or more fragments of the first tenant data;
retrieving the first encryption key from a key cache memory or a key management system (KMS) to decrypt the one or more fragments of the first tenant data based on the metadata of the non-encrypted header information;
decrypting the one or more fragments of the first tenant data using the retrieved first encryption key; and
providing the decrypted one or more fragments of the first tenant data to the block cache memory.

8. The method of claim 7, further comprising:
granting access, at the key cache memory, to the first encryption key associated with the first tenant when a requestor is authenticated.

9. The method of claim 7, wherein the first encryption key is retrieved by the KMS when the first encryption key is not available in the key cache memory.

10. The method of claim 6, further comprising:
performing, at the multitenant database system, at least one of the operations selected from the group consisting of: filtering, sorting, and indexing the one or more fragments of the first tenant data in the block cache memory.

11. The method of claim 1, further comprising:
changing, at the multitenant database system, the first encryption key at a predetermined period of time or when a key change request is received; and
storing, in the immutable storage of the multitenant database system, the first tenant data as a new version in the based on the changed key.

12. The method of claim 1, further comprising:
creating, at the multitenant database system, a sandbox tenant by associating a sandbox tenant identifier with a virtual snapshot of the first tenant data and with sandbox tenant data created by the sandbox tenant subsequent to the sandbox creation point in time,
wherein the sandbox tenant data is encrypted with the first encryption key.

13. The method of claim 12, further comprising:
selecting, at the multitenant database system, a new key for the sandbox tenant after the sandbox tenant is created.

14. The method of claim 1, further comprising:
transmitting metadata of the first tenant to be migrated from a source database instance to a destination database instance, wherein the destination database instance is located on a physical server or virtualized server different from the source database instance; and modifying, at the destination database instance, the metadata of the first tenant so that the destination database instance has information to point to groupings of data in storage for a destination database to access the first tenant data.

15. A system comprising:
one or more servers of a multitenant database system having first tenant data of a first tenant and second tenant data of a second tenant to encrypt at least one of one or more fragments of the first tenant data based on a retrieved first encryption key associated with the first tenant, to encrypt cross-tenant data using a system encryption key that is different from the first encryption key and a second encryption key associated with the second tenant, wherein the cross-tenant data is data for the first tenant and the second tenant and includes at least block indices and transaction logs, and generate non-encrypted header information for each of the encrypted one or more fragments of the first tenant data, wherein the header information has metadata including a first tenant identifier,
wherein the encrypted one or more fragments of the first tenant data and the corresponding non-encrypted header information, and the encrypted cross-tenant data are stored in an immutable storage of the multitenant database system.

16. The system of claim 15, wherein the one or more fragments of the first tenant data is encrypted by segregating, at a memory storage coupled to the multitenant database system, the first tenant data of the first tenant from at least second tenant data of the second tenant, based on the first tenant identifier.

17. The system of claim 15, wherein the encrypting the one or more fragments of the first tenant data further comprises:
retrieving, from a key cache memory based on the first tenant identifier, the first encryption key to encrypt one or more fragments of the first tenant data, wherein the first encryption key is different from the second encryption key.

18. The system of claim 15, wherein the first tenant data is for a committed transaction.

19. The system of claim 15, wherein the one or more servers of the multitenant database system grants access to the first encryption key associated with the first tenant when a requestor is authenticated.

20. The system of claim 15, further comprising:
a block cache memory communicatively coupled to the one or more servers of the multitenant database system multitenant database system,
wherein the one or more servers of the multitenant database system receives a request for the one or more fragments of the first tenant data, and determines whether the block cache memory includes the requested one or more fragments of the first tenant data, and
wherein the block cache memory provides, to the multitenant database system, the requested one or more fragments of the first tenant data when it is determined to be in the block cache memory.

21. The system of claim 20, wherein the one or more servers of the multitenant database system identifies the requested one or more fragments of the first tenant data that are encrypted by using the metadata of the non-encrypted header information for the one or more fragments of the first tenant data when the requested one or more fragments of the first tenant data are determined to not be present in the block cache memory, retrieves the first encryption key from a key cache memory or a key management system (KMS) to decrypt the one or more fragments of the first tenant data based on the metadata of the non-encrypted header information, decrypts the one or more fragments of the first tenant data using the retrieved first encryption key, and provides the decrypted one or more fragments of the first tenant data to the block cache memory.

22. The system of claim 21, wherein the key cache memory grants access to the first encryption key associated with the first tenant when a requestor is authenticated.

23. The system of claim 21, wherein the first encryption key is retrieved by the KMS when the first encryption key is not available in the key cache memory.

24. The system of claim 20, wherein the one or more servers of the multitenant database system perform at least one of the operations selected from the group consisting of: filtering, sorting, and indexing the one or more fragments of the first tenant data in the block cache memory.

25. The system of claim 15, wherein the one or more servers of the multitenant database system changes the first encryption key at a predetermined period of time or when a key change request is received, and
wherein the immutable storage of the multitenant database system stores the first tenant data as a new version based on the changed key.

26. The system of claim 15, wherein the one or more servers of the multitenant database system creates a sandbox tenant by associating a sandbox tenant identifier with a virtual snapshot of the first tenant data and with sandbox tenant data created by the sandbox tenant subsequent to the sandbox creation point in time,
wherein the sandbox tenant data is encrypted with the first encryption key.

27. The system of claim 26, wherein the one or more servers of the multitenant database system select a new key for the sandbox tenant after the sandbox tenant is created.

28. The system of claim 15, wherein the one or more servers of the multitenant database system transmits metadata of the first tenant to be migrated from a source database instance to a destination database instance, wherein the destination database instance is located on a physical server or virtualized server different from the source database instance, and modifies, at the destination database instance, the metadata of the first tenant so that the destination database instance has information to point to groupings of data in storage for a destination database to access the first tenant data.

* * * * *